United States Patent
Osawa et al.

(10) Patent No.: US 8,864,888 B2
(45) Date of Patent: Oct. 21, 2014

(54) OIL-WATER SEPARATION DEVICE AND REFINING DEVICE

(75) Inventors: Noriyoshi Osawa, Yokohama (JP); Makoto Kitano, Tokyo (JP); Kenji Sato, Fujisawa (JP)

(73) Assignee: IHI Corporation (JP)

( * ) Notice: Subject to any disclaimer, the term of this patent is extended or adjusted under 35 U.S.C. 154(b) by 42 days.

(21) Appl. No.: 13/514,480

(22) PCT Filed: Dec. 9, 2010

(86) PCT No.: PCT/JP2010/072136
§ 371 (c)(1),
(2), (4) Date: Jun. 7, 2012

(87) PCT Pub. No.: WO2011/071113
PCT Pub. Date: Jun. 16, 2011

(65) Prior Publication Data
US 2012/0255900 A1    Oct. 11, 2012

(30) Foreign Application Priority Data
Dec. 10, 2009    (JP) .............................. P2009-280602

(51) Int. Cl.
*B01D 17/028* (2006.01)
*B01D 47/06* (2006.01)
*B01D 17/04* (2006.01)
*C10G 33/06* (2006.01)

(52) U.S. Cl.
CPC .............. *B01D 17/045* (2013.01); *C10G 33/06* (2013.01)
USPC ................................ 96/236; 96/239; 210/521

(58) Field of Classification Search
USPC ...................... 96/236, 239; 210/521
See application file for complete search history.

(56) References Cited

U.S. PATENT DOCUMENTS

| 4,469,582 A | 9/1984 | Sublette et al. | 204/302 |
| 8,501,014 B2 * | 8/2013 | Byskov | 210/744 |

(Continued)

FOREIGN PATENT DOCUMENTS

| CN | 1919403 A | 2/2007 |
| JP | 49-051667 | 5/1974 |

(Continued)

OTHER PUBLICATIONS

International Search Report and Written Opinion mailed Mar. 15, 2011 in corresponding PCT International Application No. PCT/JP2010/072136.

(Continued)

*Primary Examiner* — Duane Smith
*Assistant Examiner* — Cabrena Holecek
(74) *Attorney, Agent, or Firm* — Ostrolenk Faber LLP (57) ABSTRACT

This oil-water separation device includes: a supply port (3b) for oily water; a flow passage that causes oily water (X4, X7) supplied from the supply port to flow so that a flow component in a horizontal direction is a main flow component; a floated oil recovery port (F) provided above an upper portion of the flow passage and also at a position spaced from a start end of the flow passage; and a settled oil recovery port (T) provided beneath the flow passage. According to the oil-water separation device, it is possible to separate an oil component from oily water that contains an oil component with higher viscosity.

11 Claims, 8 Drawing Sheets

(56) References Cited

U.S. PATENT DOCUMENTS

| | | | |
|---|---|---|---|
| 2008/0314726 A1* | 12/2008 | Choros | 202/105 |
| 2009/0050532 A1* | 2/2009 | Chirico | 208/177 |
| 2010/0193446 A1 | 8/2010 | Byskov | 210/744 |

FOREIGN PATENT DOCUMENTS

| | | |
|---|---|---|
| JP | 54-147568 | 11/1979 |
| JP | 58-170508 | 10/1983 |
| JP | 61-000412 | 1/1986 |
| JP | 61-067812 | 5/1986 |
| JP | 5-039603 | 5/1993 |
| JP | 2767768 | 6/1998 |
| JP | 2003-144806 | 5/2003 |
| JP | 2004-081906 | 3/2004 |
| JP | 3820433 | 9/2006 |
| JP | 2007-039613 | 2/2007 |
| JP | 3943042 | 7/2007 |
| JP | 2009-214014 | 9/2009 |

OTHER PUBLICATIONS

Office Action dated Dec. 31, 2013 issued in corresponding Chinese Patent Application No. 201080053782.5 (English translation of Search Report only).

* cited by examiner

OIL-WATER SEPARATION DEVICE AND REFINING DEVICE

CROSS-REFERENCE TO RELATED APPLICATIONS

The present application is a 35 U.S.C. §§371 national phase conversion of PCT/JP2010/072136, filed Dec. 9, 2010, which claims priority of Japanese Patent Application No. 2009-280602, filed Dec. 10, 2009, the contents of which are incorporated herein by reference. The PCT International Application was published in the Japanese language.

TECHNICAL FIELD

Background Art

Patent Document 1 described below discloses an oil-water separation device that separates oil and water from oily water. With a combination of a porous plate provided substantially orthogonal to the flow of oily water and a block of baffle plates provided posterior to the porous plate, the oil-water separation device efficiently recovers the oil that has spread over a water surface such as at sea.

Patent Document 2 described below discloses an oil-water separation device in which a partitioning plate member is provided in an oil-water separation tank, the partitioning plate member being used as a collision section for winding a flow passage to increase its length and for turning the direction of the flow of water while producing a disturbance in the water. In the oil-water separation device, when oily water passes through the collision section, a disturbance is produced in the water and the flowing direction of the water is turned. This causes the particles in the water to collide with one another to promote the flocculation of the oil particles and the water particles and also causes the oil particles to attach to the partitioning plate into coarse particles. As a result, the oil and the water are separated by the difference in specific gravity.

Patent Document 3 described below discloses, as a cleaning technique of gas containing tar, a combination of removal of heavy tar by use of an oil scrubber, removal of light tar by use of a water scrubber, and removal of particle components by use of a cyclone.

CITATION LIST

Patent Document 1: Japanese Patent No. 2767768
Patent Document 2: Japanese Patent No. 3820433
Patent Document 3: Japanese Patent No. 3943042

However, it is difficult to apply the conventional oil-water separation devices described above to oily water containing highly viscous oil. Namely, in the oil-water separation devices disclosed in Patent Documents 1 and 2, the flow passage through which oily water flows has a multitude of sites at which the passage area is small. Therefore, when oily water containing highly viscous oil is treated, a problem is posed in that the highly viscous oil attaches to the small-area sites to block the flow passage, readily resulting in functional failure.

Such being the case, it is difficult in actuality to apply the conventional oil-water separation devices described above to oily water containing extremely viscous tar component (oil component) and water component such as a gasified gas reformed/produced from coal (especially, lignite). Therefore, there is a demand for development of a novice oil-water separation device applicable to oily water containing an extremely highly viscous oil component.

The cleaning technique of Patent Document 3 has a problem in that complexity of removal process of tar and particles leads to an increase in size of the structure of the device.

DISCLOSURE OF INVENTION

The present invention has been achieved in view of the aforementioned circumstances, and has objects as follows:
(1) to provide an oil-water separation device applicable to oily water containing an oil component with higher viscosity, and
(2) to provide an oil-water separation device with a simpler structure for separating an oil component.

To achieve the above objects, a first aspect according to the present invention provides an oil-water separation device including: a supply port for oily water; a flow passage that causes the oily water supplied from the supply port to flow so that a flow component in a horizontal direction (a direction orthogonal to a vertical direction. In the present invention, a direction orthogonal to a vertical direction is defined as "horizontal direction," and hereinafter described simply as "horizontal direction.") is a main flow component; a floated oil recovery port provided above an upper portion of the flow passage and also at a position spaced from a start end of the flow passage; and a settled oil recovery port provided beneath the flow passage.

A second aspect according to the present invention provides an oil-water separation device as set forth above in the first aspect wherein the supply port is provided along a center of a barrel with a shape of a hollow cylinder supported in an erect posture along a vertical direction, wherein the flow passage is formed of a portion from the supply port to the barrel, and wherein the floated oil recovery port is formed of a region sandwiched between a bottomless cylindrical member and the barrel, the bottomless cylindrical member being provided concentrically between the supply port and the barrel.

A third aspect according to the present invention provides an oil-water separation device as set forth above in the second aspect, further including: a flow adjustment device that suppresses a drift component different from the main flow component of the oily water flowing from the supply port to the barrel.

A fourth aspect according to the present invention provides an oil-water separation device as set forth above in any of the first to third aspects, further including: a partition member at an outlet of the flow passage, the partition member partitioning the flow passage into a multitude of vertical stages of sectional flow passages that are inclined downwardly from a start end thereof to a terminal end thereof.

A fifth aspect according to the present invention provides a refining device that refines a gas to be refined at least by removing an oil component, including: a spray tower that separates at least an oil component in a gas to be refined from the gas to be refined by spraying water; and the oil-water separation device, as set forth above in any of the first to fourth aspects, that separates an oil component from oily water discharged from the spray tower.

In the aforementioned refining device, a mist separator that separates an oil component again from the gas to be refined may be provided at a subsequent stage of the spray tower.

In each of the aforementioned refining devices, the gas to be refined may be a gasified gas produced from lignite.

Advantageous Effects of the Invention

According to the present invention, while oily water is flowing through a flow passage, an oil component, contained in the oily water, with a specific gravity greater than that of water settles to be captured in a lower portion of the flow passage, and an oil component with a specific gravity less than that of water surfaces to be captured in an upper portion of the flow passage. Namely, the present invention utilizes the difference in specific gravity of the components in oily water to separate an oil component from water. This eliminates the necessity of causing oily water to pass through a narrow flow passage as is the case with conventional oil-water separation devices. Therefore, it is possible to separate a highly viscous oil component from water.

Furthermore, according to the present invention, it will suffice only to cause oily water to pass through the flow passage. This leads to a device with a simpler structure. Therefore, it is possible to achieve a reduction in cost.

In addition, according to the present invention, it is possible to refine a gasified gas that contains an oil component with higher viscosity and also to reduce the cost related to the refining.

BEST MODE FOR CARRYING OUT THE INVENTION

Hereunder is a description of an embodiment of the present invention with reference to the drawings.

Figure 1:
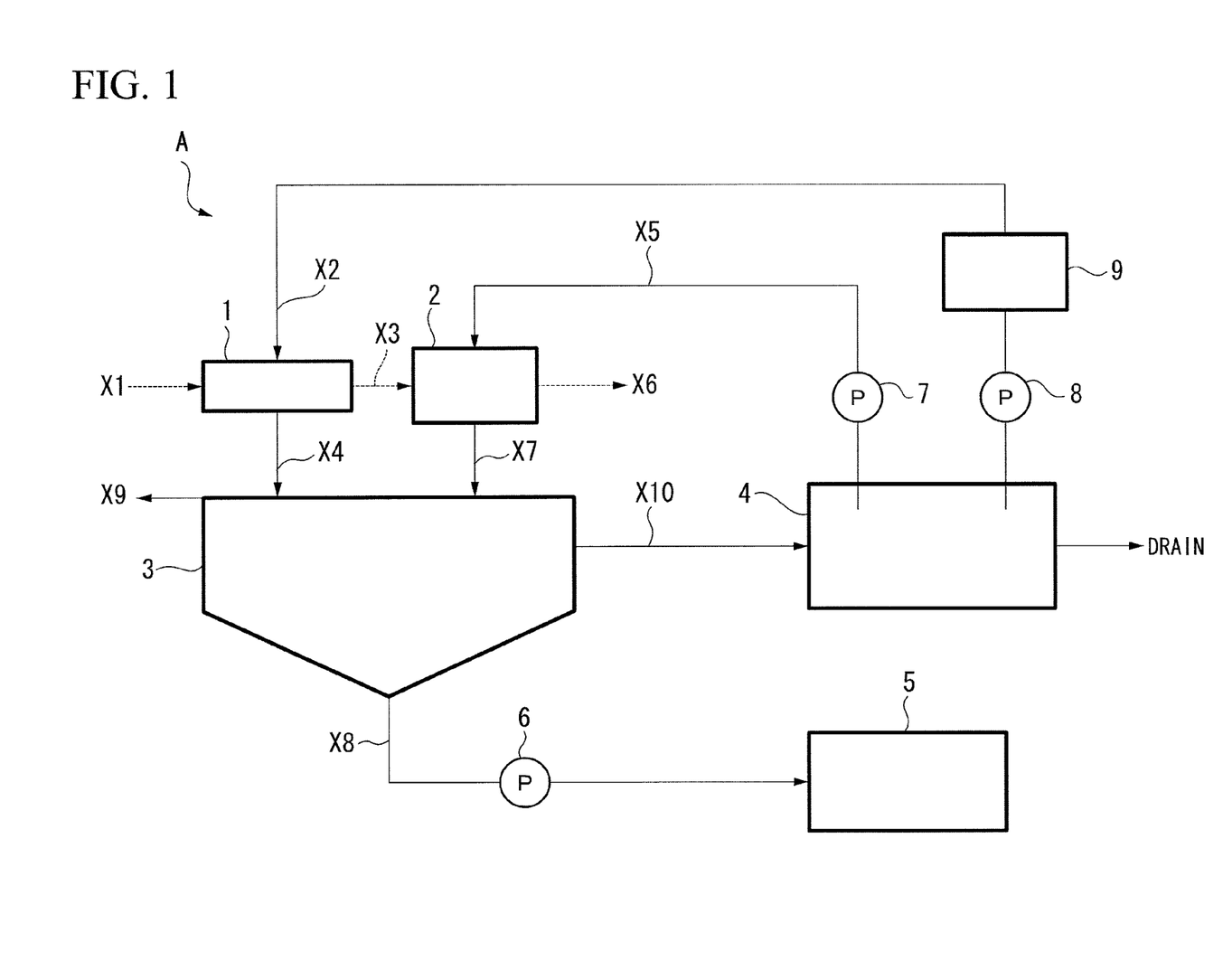
FIG. 1 is a block diagram showing a structure of the main part of a refining device according to an embodiment of the present invention.

As shown in FIG. 1, a refining device A according to the present embodiment includes: a spray tower 1; a mist separator 2; a tar decanter 3 (oil-water separation device); a buffer tank 4; a tar tank 5; pumps 6 to 8; and a cooler 9. The refining device A is a device that refines a gasified gas X1 (gas to be refined) supplied from the outside.

Typically, a gasified gas is known as a combustible gas obtained by steam-reforming biomass or coal. The gasified gas is useful as a fuel and a constituent raw material. The gasified gas X1 of the present embodiment is one obtained by steam-reforming lignite, which is comparatively inferior coal. The gasified gas X1 contains extremely highly viscous tar (oil component), sludge as particles of solid matter other than the oil component, and steam (water component).

The spray tower 1 sprays coolant water X2 over the gasified gas X1 as a treatment target to cool the gasified gas X1, and also separates and removes sludge contained in the gasified gas X1 from the gasified gas X1. The spray tower 1 cools the gasified gas X1 at, for example, 400° C. to approximately 75° C., to thereby condense the oil component (mainly, tar component) contained in the gasified gas X1. The spray tower 1 supplies a treated gasified gas X3 to the mist separator 2, and also drains oily water X4 made of water, tar, and sludge to the tar decanter 3.

The mist separator 2 is provided supplementarily to the spray tower 1. The mist separator 2 sprays separated water X5 as droplets finer than those of the coolant water X2 over the treated gasified gas X3 supplied from the spray tower 1, to thereby remove mist-like unnecessary oil component and sludge that the spray tower 1 is not capable of sufficiently removing. The mist separator 2 outputs the treated gasified gas to the outside as a refined gas X6, and also drains oily water X7 made of water, tar particles, and sludge to the tar decanter 3.

The tar decanter 3 is the most characteristic constituent element in the refining device A. The tar decanter 3 separates tar particles and sludge, which are contained in the oily water X4 supplied from the spray tower 1 and in the oily water X7 supplied from the mist separator 2, into particles with a specific gravity greater than that of water, which is the main component, and particles with a specific gravity less than that of water. Namely, the tar decanter 3 separates the various particles contained in water into particles with a specific gravity greater than water and particles with a specific gravity less than water by utilizing their specific gravities and particle sizes. The tar decanter 3 discharges the particles with a specific gravity greater than that of water from its lower portion as a settled tar X8, discharges the particles with a specific gravity less than that of water from its upper portion as surfaced tar X9, and discharges treated water X10, from which the settled tar X8 and the surfaced tar X9 have been separated, from its upper portion.

The buffer tank 4 is a reservoir tank for temporarily storing the treated water X10 supplied from the upper portion of the tar decanter 3, and is also a supply source of the coolant water X2 and the separated water X5. To the buffer tank 4, the treated water X10 is continuously supplied from the tar decanter 3. In addition, a part of the treated water X10 is pumped out by the pumps 7, 8. This produces surplus water. The buffer tank 4 drains this surplus water to the outside. The tar tank 5 is a reservoir tank for temporarily storing the settled tar X8 supplied from the lower portion of the tar decanter 3. The pump 6 is provided at a position along the pipe that connects between the lower portion of the tar decanter 3 and the tar tank 5. The pump 6 sucks out the settled tar X8 accumulated in the lower portion of the tar decanter 3 and supplies it to the tar tank 5.

The pump 7 is provided at a position along the pipe that connects between the buffer tank 4 and the mist separator 2. The pump 7 pumps up the treated water X10 from the buffer tank 4 and supplies it to the mist separator 2 as the separated water X5. The pump 8 is provided at a position along the pipe that connects between the buffer tank 4 and the spray tower 1. The pump 8 pumps up the treated water X10 from the buffer tank 4 and supplies it to the spray tower 1. In the pipe that connects between the buffer tank 4 and the spray tower 1, the cooler 9 is provided between the pump 8 and the spray tower 1. The cooler 9 cools the treated water X10 supplied from the pump 8 through heat exchange with an external heat transfer medium, and supplies the cooled, treated water X10 to the spray tower 1 as the coolant water X2.

Subsequently, a detailed structure of the tar decanter 3 (oil-water separation device), which is the most characteristic constituent element in the refining device A, will be described with reference to FIG. 2.

Figure 2:
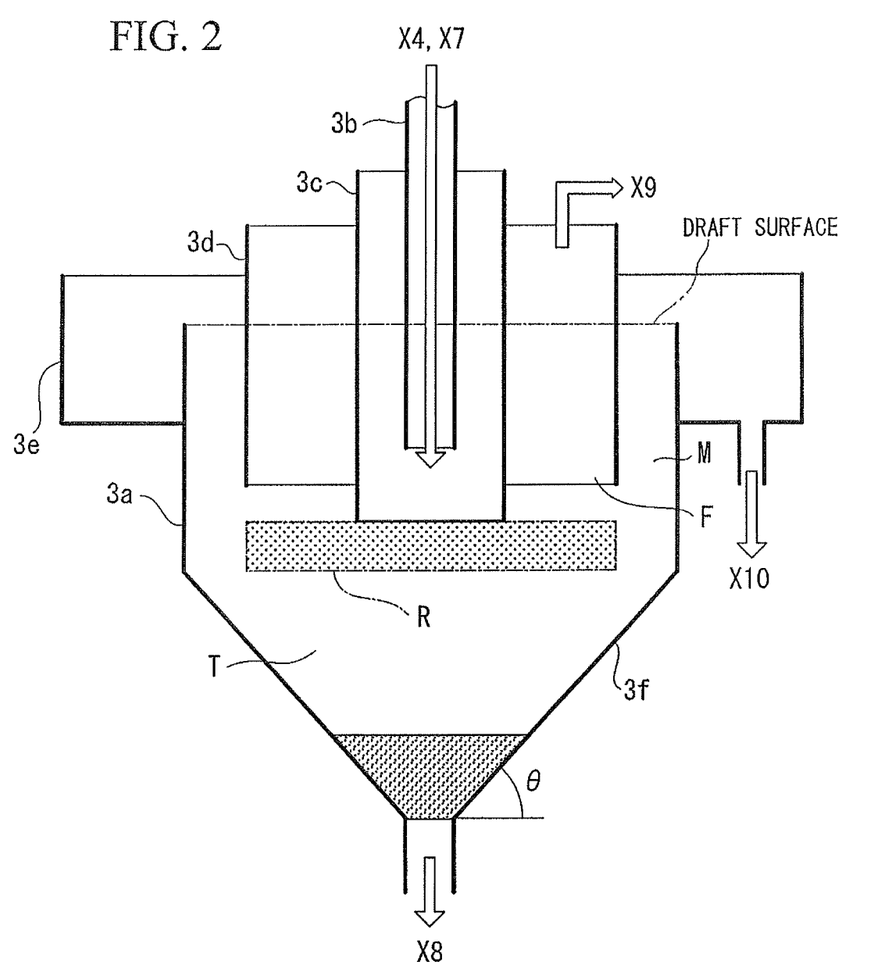
FIG. 2 is a vertical cross-sectional view showing a structure of the main part of a tar decanter (oil-water separation device) according to the embodiment of the present invention.

As shown in FIG. 2, the tar decanter 3 is made of: a barrel 3*a*; a supply pipe 3*b* (supply port); a center well 3*c*; a recovery baffle 3*d*; an upper reservoir portion 3*e*; and a lower reservoir portion 3*f*.

The barrel 3*a* is a hollow cylinder fixed in an erect posture along the vertical direction. Its upper portion is open while its lower portion is connected to the lower reservoir portion 3*f*. Namely, the barrel 3*a* is formed as a substantially cylindrical container integrated with the lower reservoir portion 3*f*. As shown in the figure, the supply pipe 3*b* is a pipe provided concentrically with an axis line (center) of the barrel 3*a*. The supply pipe 3*b* supplies the oily waters X4, X7 downwardly from its lower end. The center well 3*c* is a cylindrical member provided in an erect posture along the vertical direction between the supply pipe 3*b* and the barrel 3*a* in a manner concentrical with the barrel 3*a* and the supply pipe 3*b*. A front end (lower edge) of the center well 3*c* is set to a position lower than that of a front end (lower edge) of the supply pipe 3*b* by a predetermined distance, as shown in the figure.

The recovery baffle 3*d* is a cylindrical member provided in an erect posture along the vertical direction, similarly to the center well 3*c*, between the center well 3*c* and the barrel 3*a* in a manner concentrical with the barrel 3*a* and the supply pipe 3*b*. A front end (lower edge) of the recovery baffle 3*d* is set to a position higher than that of the front end (lower edge) of the center well 3*c* by a predetermined distance, as shown in the figure.

Here, as shown in the figure, a disk-like region which is positioned beneath the center well 3*c* and whose circumference coincides with the line directly below the recovery baffle 3*d* is a separation zone R where the tar particles and sludge contained in the oily waters X4, X7 are separated according to their specific gravities while they change the direction of their flow to the horizontal direction to reach the line directly below the recovery baffle 3*d*. An opening region between the lower edge of the center well 3*c* and the lower edge of the recovery baffle 3*d* is a floated oil recovery port F of the tar decanter 3 (oil-water separation device). An opening region between the lower edge of the recovery baffle 3*d* and the barrel 3*a* is a water recovery port M from which mainly the treated water is selectively recovered.

The upper reservoir portion 3*e* is a portion provided annularly along the outer circumference of the upper portion of the barrel 3*a* so as to surround the barrel 3*a*. To the upper reservoir portion 3*e*, a pipe is connected that is positioned around the upper portion of the tar decanter 3 and also supplies the surfaced tar X9 to the buffer tank 4. An upper edge of the barrel 3*a* is set to be lower than that of the center well 3*c*, that of the recovery baffle 3*d*, and that of the upper reservoir portion 3*e*, as shown in the figure. Namely, the water level (draft) of the tar decanter 3 is at the upper edge of the barrel 3*a*, as shown with a single-dotted dashed line in FIG. 2. The treated water X10 having flowed over the upper edge of the barrel 3*a* is stored in the upper reservoir portion 3*e*, and is then supplied from the reservoir portion 3*e* to the buffer tank 4.

As shown in the figure, the lower reservoir portion 3*f* is generally formed as an inverted cone, and is located in the lower portion of the tar decanter 3. In the lower reservoir portion 3*f*, an oil component and sludge that have been separated in the separation zone R and have specific gravity greater than that of water are deposited. To the center of the lower portion of the lower reservoir portion 3*f* (the lower portion of the tar decanter 3), a pipe for supplying the settled tar X8 to the tar tank 5 is connected. A repose angle θ in the shape of the lower reservoir portion 3*f* is set to, for example, 45° so that an oil component and sludge with a specific gravity greater than that of water is effectively discharged. An upper-end opening region of the lower reservoir portion 3*f* (namely, a lower-end opening region of the barrel 3*a*) is a settled oil recovery port T in the tar decanter 3 (oil-water separation device).

Figure 3:
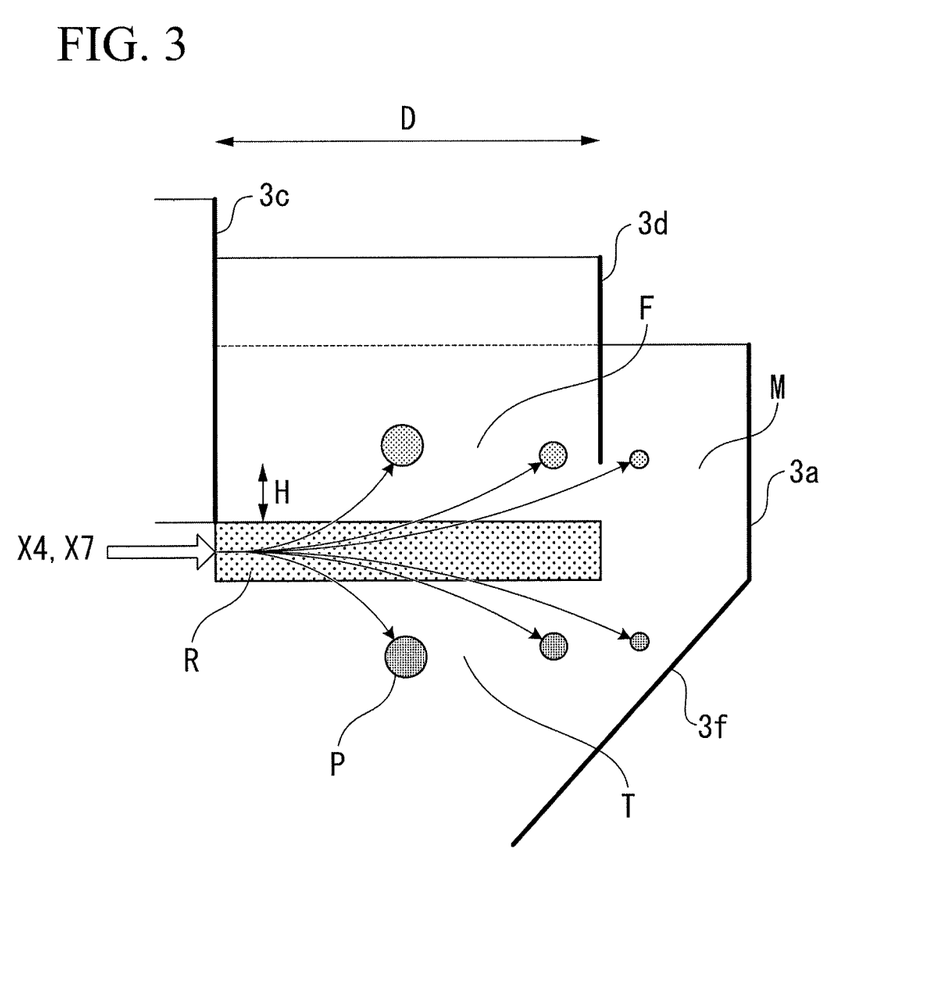
FIG. 3 is a schematic diagram showing a principle of operation of the tar decanter (oil-water separation device) according to the embodiment of the present invention.

Next is a detailed description of an operation of the refining device A with this structure, especially an operation of its characteristic element, namely, the tar decanter 3 (oil-water separation device), with reference to FIG. 3.

Firstly, a general operation of the refining device A will be described. In the spray tower 1 of the refining device A, tar (oil component), sludge (solid component), and water and steam (water component) are removed from the gasified gas X1 as a refining treatment target by the action of the coolant water X2. Subsequently, in the mist separator 2, tar, sludge, and steam are removed from the gasified gas X1 by the action of the separated water X5. Namely, the gasified gas X1 is refined in two stages in the spray tower 1 and in the mist separator 2. As a result, compared with typical single-stage refining, a refined gas X6 refined to high purity is produced.

On the other hand, the oily waters X4, X7 produced by the refining treatments respectively in the spray tower 1 and the mist separator 2 are collected in the tar decanter 3. They are sent into the tar decanter 3 as a slow flow via the supply pipe 3*b*. As described above, the oily waters X4, X7, which have flowed out downwardly from the front end of the supply pipe 3*b*, are drained from the tar decanter 3 over the upper edge of the barrel 3*a*. Therefore, the direction of flow of the oily waters X4, X7 is changed to the horizontal direction toward the barrel 3*a*.

The aforementioned separation zone R is a flow field in which a horizontal flow component of the oily waters X4, X7 is the main flow component. In the separation zone R, the tar particles and sludge contained in the oily waters X4, X7 flowing slowly from the center well 3*c* toward the barrel 3*a* settle out or surface based on their own specific gravities and particle sizes with respect to those of water and on their own moving velocities (terminal velocities).

Namely, of the tar particles and sludge moving from the center well 3c toward the barrel 3a, those with a specific gravity greater than that of water settle out from the separation zone R, pass through the settled oil recovery port T, are selectively collected in the lower reservoir portion 3f, and are then discharged as the settled tar X8. On the other hand, of the tar particles and sludge moving from the center well 3c toward the barrel 3a, those with a specific gravity less than that of water and also with a particle size larger than that of water, and those with a small particle size but with extremely a low specific gravity do not pass through the recovery baffle 3d but are selectively collected as the surfaced tar X9 via the opening between the center well 3c and the recovery baffle 3d, namely, via the floated oil recovery port F, and are then discharged to the outside.

Thus, most of the tar particles and sludge moving from the center well 3c toward the barrel 3a flows into the settled oil recovery port T or the floated oil recovery port F. However, those with an extremely small particle size and those with a large particle size but with a specific gravity extremely close to that of water pass through the recovery baffle 3d, flow into the opening between the recovery baffle 3d and the barrel 3a, namely the water recovery port M, are collected in the upper reservoir portion 3e, and are then discharged to the buffer tank 4 as the treated water X10.

The particles denoted with reference symbol P in FIG. 3 schematically show behaviors of the aforementioned tar particles and sludge in the separation zone R.

Therefore, a horizontal distance D from the lower edge of the center well 3c to the lower edge of the recovery baffle 3d and a vertical distance (a distance along the vertical direction) H from the lower edge of the center well 3c to the lower edge of the recovery baffle 3d are extremely important parameters for screening and selectively recovering the surfaced tar X9 from the treated water X10. The horizontal distance D and the vertical distance H are optimally set so that most of the tar particles with a specific gravity less than that of water flows into the floated oil recovery port F based on terminal velocities V of the tar particles found by Stokes' formula, Allen's formula, or Newton's formula according to Reynolds numbers of the tar particles, on distribution of particle sizes of the tar particles, on specific gravities of the particles, and the like.

For example, the tar contained in lignite is, as described in known documents, made from naphthalene oil, carbolic oil, wash oil, anthracene oil, and pitch. Of these components, naphthalene oil has a specific gravity of 0.98, which is less than that of water while carbolic oil, wash oil, anthracene oil, and pitch have a specific gravity of 1 or greater, which is not less than that of water. Therefore, the naphthalene oil forms the aforementioned surfaced tar X9 while the carbolic oil, wash oil, anthracene oil, and pitch form the settled tar X8. The horizontal distance D and the vertical distance H are set so that most of the particles of the naphthalene oil forming the surfaced tar X9 flows into the floated oil recovery port F.

Figure 4A:
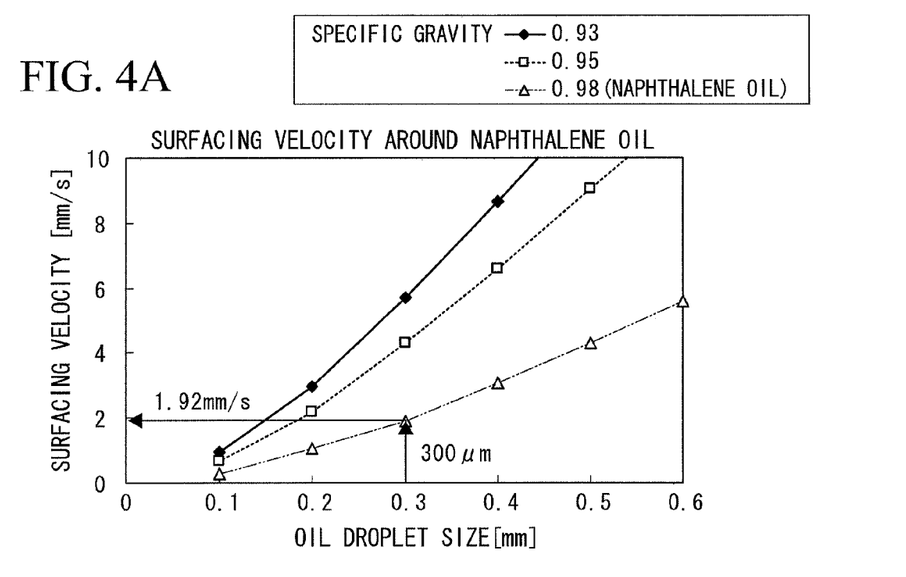
FIG. 4A is a graph showing calculation results of terminal velocities (surfacing velocities) according to the particle size (oil droplet size) of naphthalene oil and the particles with a specific gravity close to that of naphthalene oil in the separation zone in the case of the tar decanter (oil-water separation device) according to the embodiment of the present invention.
Figure 4B:
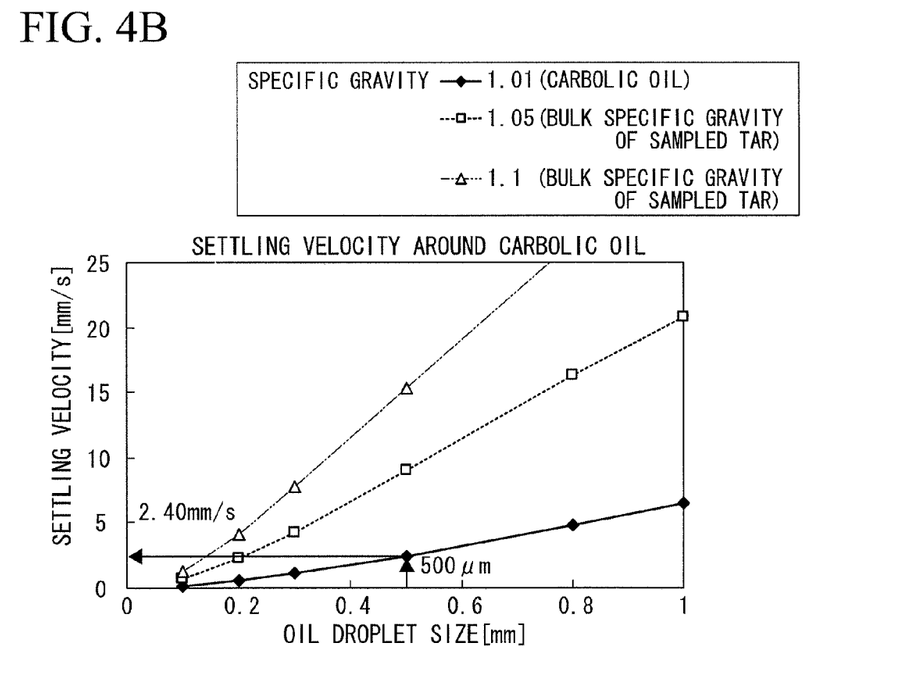
FIG. 4B is a graph showing calculation results of terminal velocities (settling velocities) according to the particle size (oil droplet size) of carbolic oil and the particles with a specific gravity close to that of carbolic oil in the separation zone in the case of the tar decanter (oil-water separation device) according to the embodiment of the present invention.
Figure 4C:
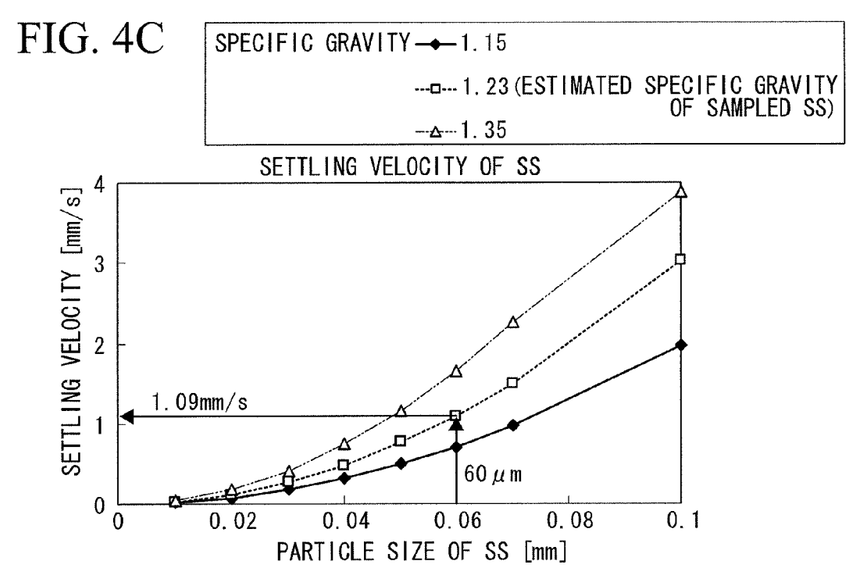
FIG. 4C is a graph showing calculation results of terminal velocities (settling velocities) according to the particle size (oil droplet size) of SS particles (sludge) and the particles with a specific gravity close to that of an SS particle in the separation zone in the case of the tar decanter (oil-water separation device) according to the embodiment of the present invention.

FIG. 4A to FIG. 4C are graphs showing calculated results of terminal velocities (surfacing velocities or settling velocities) of the tar particles in the separation zone R according to their particle sizes (oil droplet sizes). Of these figures, FIG. 4A shows the surfacing velocities (terminal velocities) of the particles of the naphthalene oil (surfacing oil) and the particles with a specific gravity close to that of the naphthalene oil (reference particles) according to their oil droplet sizes. FIG. 4B shows settling velocities (terminal velocities) of the particles of the carbolic oil (settling oil) and the particles with a specific gravity close to that of the carbolic oil (reference particles) according to their oil droplet sizes. FIG. 4C shows settling velocities (terminal velocities) of the SS particles (sludge) and the particles with specific gravity close to that of the SS particles (reference particles) according to their particle sizes. Any of the graphs indicate that the terminal velocities change with the particle sizes. The terminal velocities (moving velocities) of the tar particles and sludge in the separation zone R are extremely important factors for determining whether the tar particles and sludge flow into the settled oil recovery port T or into the water recovery port M.

Figure 5:
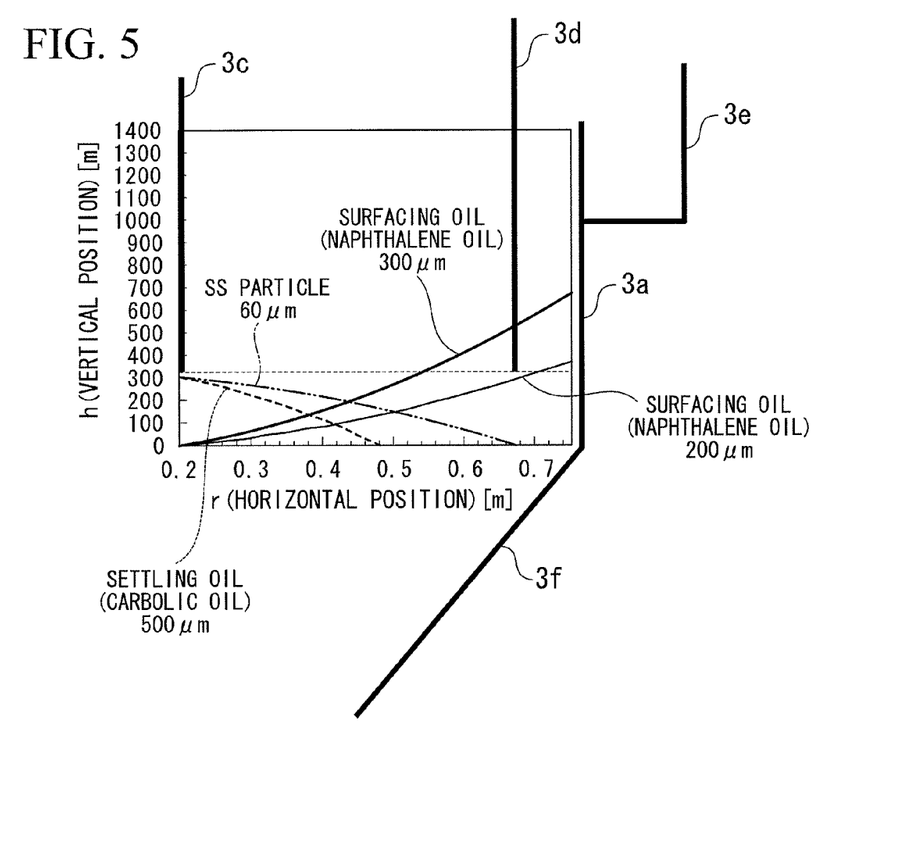
FIG. 5 is a characteristic diagram showing settling and surfacing trails of the tar particles with their representative particle size in the case of the tar decanter (oil-water separation device) according to the embodiment of the present invention.

FIG. 5 is a characteristic diagram showing settling and surfacing traces of the tar particles with their representative particle sizes. As for the naphthalene oil (surfacing oil), FIG. 5 shows surfacing traces for the particles with representative particle sizes of 200 μm and 300 μm. As for the carbolic oil (settling oil), FIG. 5 shows a settling trace for the particle with a representative particle size of 500 μm. As for the SS particle (sludge), FIG. 5 shows a settling trace for the particle with a representative particle size of 60 μm. These representative particle sizes are average particle sizes of the tar particles and sludge (SS particles) contained in the oily waters X4, X7. With regard to the naphthalene oil (surfacing oil), it can be read that the particle with a representative particle size of 200 μm and the particle with a representative particle size of 300 μm reach the recovery baffle 3d at widely different points in the vertical position. Therefore, it is required to optimize the horizontal distance D and the vertical distance H in consideration of the distribution of the particle sizes of the naphthalene oil contained in the oily waters X4, X7.

Conventional oil-water separation devices are not capable of separating a highly viscous oil component such as tar from water. However, according to the tar decanter 3 of the refining device A, it is possible to separate extremely highly viscous tar particles contained in the oily waters X4, X7 only by passing them through the separation zone R.

Furthermore, utilization of the specific gravity of the tar allows the surfacing oil and the settling oil to be separated easily and simultaneously only by passing them through the separation zone R. Consequently, the structure for separating the oil component is simpler, and hence, lower in cost than the conventional case. In addition, the tar decanter 3 is provided with a plurality of zones partitioned by the barrel 3a, the center well 3c, and the recovery baffle 3d. As a result, a plurality of particles with different specific gravities can be selectively and simultaneously recovered from the settled oil recovery port T or the water recovery port M via the plurality of zones. This enables further selection of the surfacing oil with ease.

Moreover, according to the refining device A, adoption of the tar decanter 3 makes it possible to refine oily water containing an oil component with higher viscosity, and also makes the cost of the refining device A lower.

The present invention is not limited to the aforementioned embodiment. For example, the following modifications can be conceived.

(1) As described above, the separation zone R is a flow field in which the flow component of the oily waters X4, X7 in the horizontal direction is the main flow component. The direction of flow of the oily waters X4, X7 supplied from the supply pipe 3b is downward. Therefore, the oily waters X4, X7 flowing through the separation zone R locally contains a flow component in the vertical direction (drift component) which is different from the main flow component. However, to set (design) the horizontal distance D and the vertical distance H, there is no other choice but to make a design on the supposition that the velocity component in the flow field of the separation zone R is made only of the aforementioned main flow component. Consequently, there is a need to suppress the drift component in the separation zone R as much as possible.

Against this backdrop, tar decanters 3A to 3D according to modifications as shown respectively in FIG. 6A to FIG. 6D can be conceived. In the tar decanters 3A to 3D, there are respectively provided flow adjustment members 10A to 10D (flow adjustment devices) underneath the center well 3c. The flow adjustment members 10A to 10D suppress a drift component. The flow adjustment member 10A of the tar decanter 3A is a disk-like flat plate. It is provided in a horizontal posture underneath a lower edge of the center well 3c at a predetermined distance therefrom. Furthermore, an axis center of the flow adjustment member 10A coincides with that of the center well 3c. According to the flow adjustment member 10A, the flow of the oily waters X4, X7 supplied from the supply pipe 3b is restricted by the flow adjustment member 10A into a main flow component, as shown in the figure.

Figure 6A:
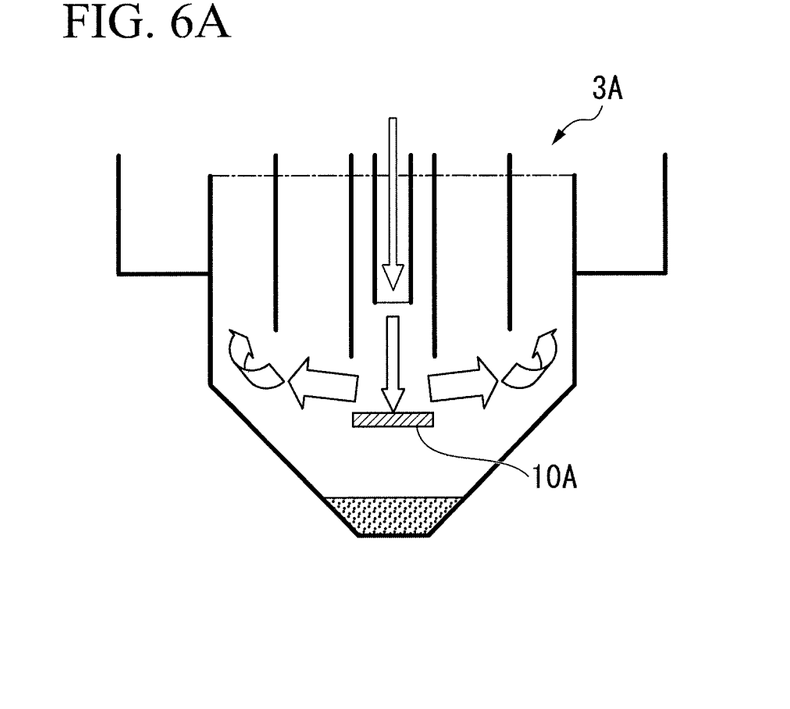
FIG. 6A is a vertical cross-sectional view showing a structure of the main part of a tar decanter (oil-water separation device) according to a modification of the present invention.
Figure 6B:
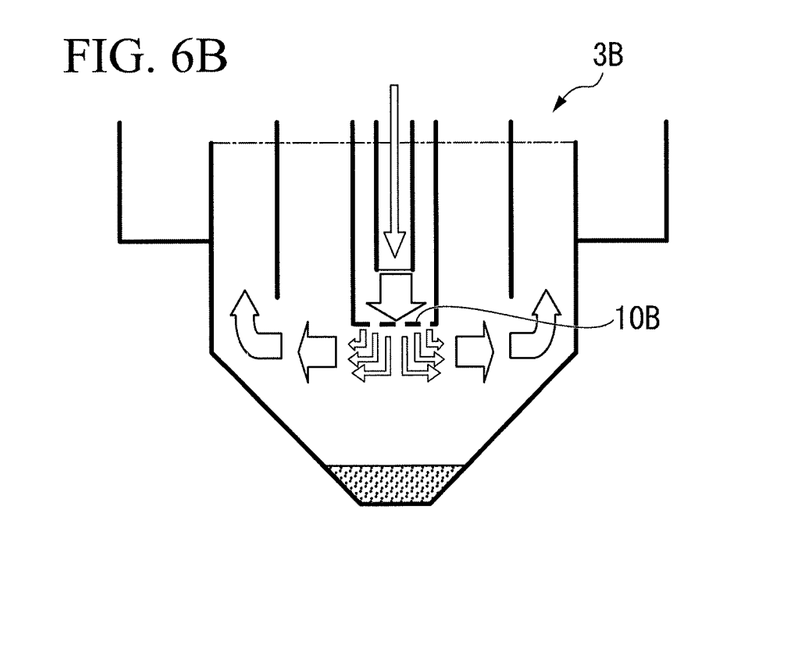
FIG. 6B is a vertical cross-sectional view showing a structure of the main part of a tar decanter (oil-water separation device) according to a modification of the present invention.

The flow adjustment member 10B of the tar decanter 3B is a disk-like punched metal sheet. It is attached in a horizontal posture to a lower edge of the center well 3c. Furthermore, an axis center of the flow adjustment member 10B coincides with that of the center well 3c. According to the flow adjustment member 10B, the flow of the oily waters X4, X7 supplied from the supply pipe 3b is divided into fine flows by the flow adjustment member 10B, as shown in the figure. This increases the main flow component.

Figure 6C:
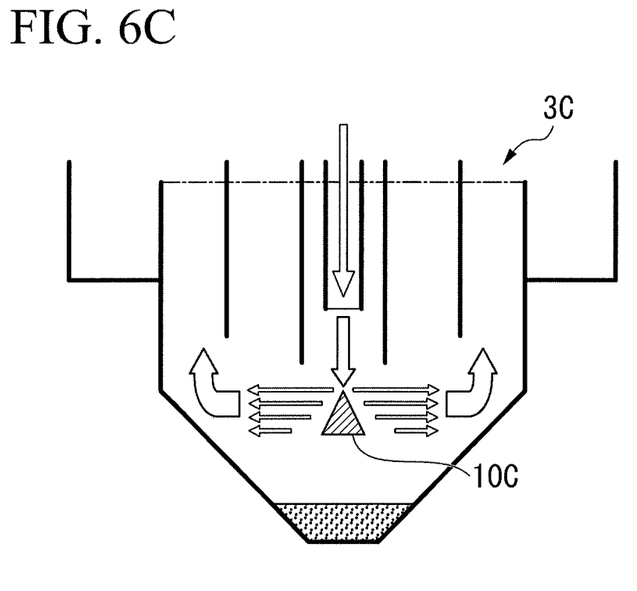
FIG. 6C is a vertical cross-sectional view showing a structure of the main part of a tar decanter (oil-water separation device) according to a modification of the present invention

The flow adjustment member 10C of the tar decanter 3C is a conical member. It is provided at a position underneath a lower edge of the center well 3c at a predetermined distance therefrom, with its vertex directed upwardly and so that its axis center coincides with that of the center well 3c. According to the flow adjustment member 10C, the flow of the oily waters X4, X7 supplied from the supply pipe 3b has its direction changed by a conical surface of the flow adjustment member 10C into the main flow component, as shown in the figure.

Figure 6D:
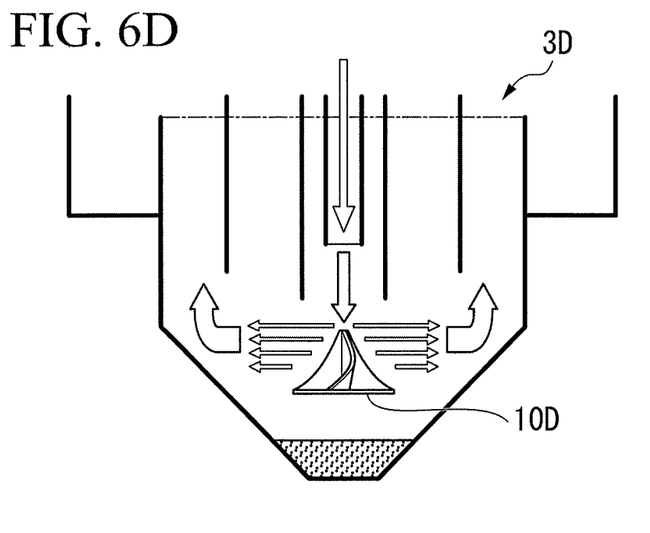
FIG. 6D is a vertical cross-sectional view showing a structure of the main part of a tar decanter (oil-water separation device) according to a modification of the present invention

The flow adjustment member 10D of the tar decanter 3D is a member with a bladed-turbine shape (fixed blades) that is generally formed as a conical shape. It is provided at a position underneath a lower edge of the center well 3c at a predetermined distance therefrom, with its vertex directed upwardly and so that its axis center coincides with that of the center well 3c. According to the flow adjustment member 10D, the flow of the oily waters X4, X7 supplied from the supply pipe 3b has its direction changed by the blades provided on the flow adjustment member 10D into the main flow component, similarly to the aforementioned flow adjustment member 10C.

Figure 7:
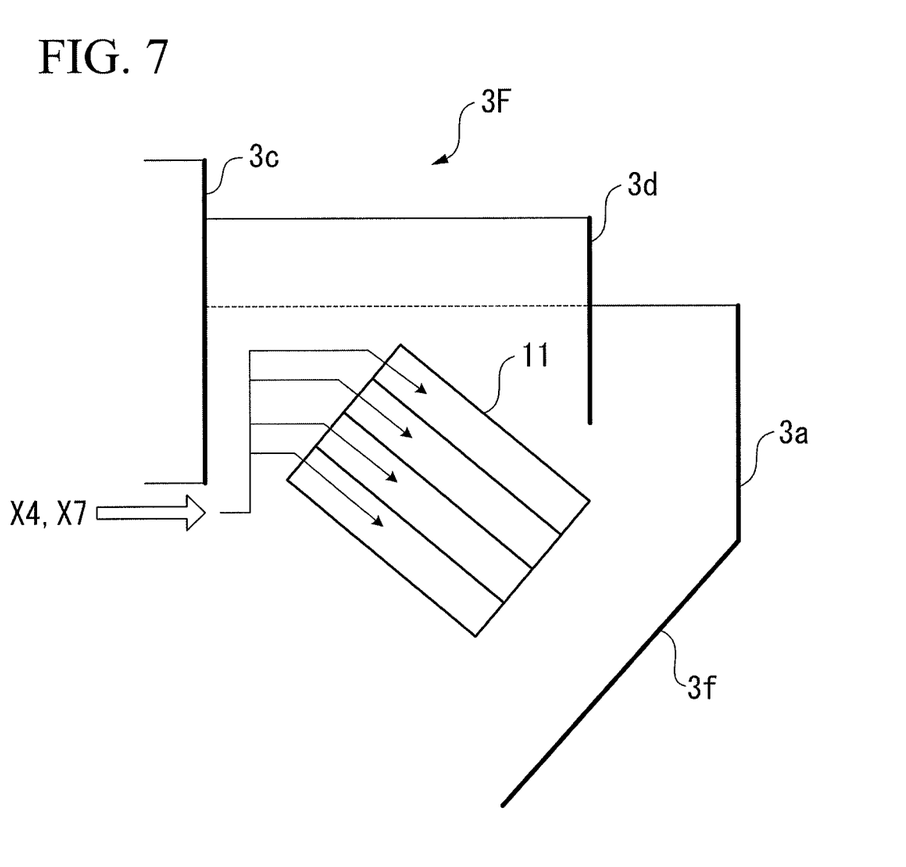
FIG. 7 is a vertical cross-sectional view showing a structure of the main part of a tar decanter (oil-water separation device) according to a modification of the present invention.

(2) As another modification for suppressing the aforementioned drift component, a tar decanter 3F shown in FIG. 7 can be conceived. In the tar decanter 3F, a partition member 11 is provided on an outlet side (on the recovery baffle 3d side) of a flow passage from the center well 3c to the recovery baffle 3d. The partition member 11 is for partitioning the flow passage into a plurality of stages. As shown in the figure, the partition member 11 partitions the flow passage into four stages in the vertical direction. It is provided in an inclined state at a predetermined angle (for example, 45°) so that its end edge (the edge on the recovery baffle 3d side) is lower than its start edge (the edge on the center well 3c side). With the partition member 11, the outlet of the flow passage from the center well 3c to the recovery baffle 3d is partitioned into four sectional flow passages that are arranged in the vertical direction and are also inclined downwardly with a predetermined inclination from the inlet (on the center well 3c side) to the outlet.

In the tar decanter 3F with this structure, the outlet of the flow passage from the center well 3c to the recovery baffle 3d is partitioned into four stages. This restricts the width of the flow passage in the vertical direction, making it possible to suppress the drift component. Furthermore, in the tar decanter 3F, the four sectional flow passages are formed so as to be inclined downwardly with a predetermined inclination toward their outlets. This substantially elongates the length of the flow passage. As a result, the period of time (moving time) for the tar particles and sludge to move from the center well 3c to the recovery baffle 3d is made longer, to thereby facilitate the separation of the surfacing oil. The vertical widths of the sectional flow passages formed by the partition member 11 are set so that the tar particles and sludge do not attach to the partition member 11 to block the sectional flow passages.

(3) In the aforementioned embodiment and modifications, the supply pipe 3b is arranged along the center of the barrel 3a that is installed in the erect posture along the vertical direction. The region between the supply pipe 3b and the barrel 3a is used as a flow passage through which the oily waters X4, X7 flow. However, the flow passage is not limited to this. For example, along a side of a flow passage with a rectangular shape when seen in a planar view, a supply port is provided in a linear shape. Along the side opposite to the linear supply port, a linear upper reservoir portion (a recovery port for water) is provided so as to be opposed to the supply port in a parallel manner. A rectangular region between the linear supply port and the upper reservoir portion (the recovery port for water) may be used as a flow passage.

(4) In the aforementioned embodiment and modifications, the gasified gas X1 is used as the gas to be refined. However, the gas to be refined is not limited to this. Furthermore, the treatment target of the tar decanter 3 is not limited to the oily waters X4, X7 that contain the tar particles and sludge separated from the gasified gas X1.

INDUSTRIAL APPLICABILITY

According to the oil-water separation device of the present invention, it is possible to separate a highly viscous oil component from water. Furthermore, it will suffice only to cause oily water to pass through the flow passage. This results in an device with a simpler structure, thus making it possible to achieve a reduction in cost. In addition, according to the refining device of the present invention, it is possible to refine a gasified gas that contains an oil component with higher viscosity and also to reduce the cost related to the refining.

DESCRIPTION OF THE REFERENCE SYMBOLS

A: refining device, 1: spray tower, 2: mist separator, 3: tar decanter, 3a: barrel, 3b: supply pipe (supply port), 3c: center well, 3d: recovery baffle, 3e: upper reservoir portion, 3f: lower reservoir portion, 4: buffer tank, 5: tar tank, 6, 7, 8: pump, 9: cooler, X1: gasified gas (gas to be refined), X2: coolant water, X3: treated gasified gas, X4, X7: oily water, X5: separated water, X6: refined gas, X8: settled tar, X9: surfaced tar, X10: water, T: settled oil recovery port, F: floated oil recovery port, M: water recovery port

The invention claimed is:
1. An oil-water separation device comprising:
 a barrel with a shape of a hollow cylinder supported in an erect posture along a vertical direction;
 a supply port for oily water provided along a center of the barrel;
 a flow passage that receives the oily water supplied from the supply port and directs the received oily water to flow along a flow direction with a flow component in a horizontal direction that is a main flow component;

a floated oil recovery port provided above an upper portion of the flow passage and also provided at an outer circumference side of the flow passage; and a settled oil recovery port provided beneath the flow passage, wherein the flow passage is a region that extends from a location below a lower portion of the supply port toward an inner circumference of the barrel in a horizontal direction, and wherein the floated oil recovery port is formed of a region sandwiched between a bottomless cylindrical member and the barrel, the bottomless cylindrical member being provided concentrically between the supply port and the barrel.

2. The oil-water separation device according to claim 1, further comprising:

a flow adjustment device that suppresses a drift component different from the main flow component of the oily water flowing from the supply port to the barrel.

3. The oil-water separation device according to claim 1, further comprising:

a partition member at an outlet of the flow passage, the partition member partitioning the flow passage into a multitude of vertical stages of sectional flow passages that are inclined downwardly from a start end thereof to a terminal end thereof.

4. A refining device that refines a gas to be refined at least by removing an oil component, comprising:

a spray tower that separates at least an oil component in a gas to be refined from the gas to be refined by spraying water; and the oil-water separation device according to claim 1 that separates an oil component from oily water discharged from the spray tower.

5. A refining device that refines a gas to be refined at least by removing an oil component, comprising:

a spray tower that separates at least an oil component in a gas to be refined from the gas to be refined by spraying water; and the oil-water separation device according to claim 3 that separates an oil component from oily water discharged from the spray tower.

6. The refining device according to claim 4, wherein a mist separator that separates an oil component again from the gas to be refined is provided at a subsequent stage of the spray tower.

7. The refining device according to claim 5, wherein a mist separator that separates an oil component again from the gas to be refined is provided at a subsequent stage of the spray tower.

8. The refining device according to claim 4, wherein the gas to be refined is a gasified gas produced from lignite.

9. The refining device according to claim 5, wherein the gas to be refined is a gasified gas produced from lignite.

10. The refining device according to claim 6, wherein the gas to be refined is a gasified gas produced from lignite wall.

11. The refining device according to claim 7, wherein the gas to be refined is a gasified gas produced from lignite.

\* \* \* \* \*